United States Patent [19]
Székely et al.

[11] Patent Number: 4,832,078
[45] Date of Patent: May 23, 1989

[54] QUICK-ACTION VALVE

[75] Inventors: Lajos Székely, Kolostor u. 17, H-1037 Budapest; Attila Hámori, Emöd u. 70, H-1031 Budapest; Miklós Vida, Baranyai u. 27, H-1117 Budapest; Károly Kunos, Budoaörs, all of Hungary

[73] Assignees: Lajos Szekely; Attila Hamori; Miklos Vida, all of Budapest, Hungary

[21] Appl. No.: 69,441

[22] Filed: Jun. 9, 1987

[51] Int. Cl.$^4$ .................... F16K 37/00; F16K 31/528
[52] U.S. Cl. .................... 137/553; 251/228; 251/232; 251/285; 251/298; 251/303
[58] Field of Search ............ 137/522, 523, 524, 527.8, 137/527, 553; 251/285, 298, 303, 228, 232, 238

[56] References Cited

U.S. PATENT DOCUMENTS

| 1,704,209 | 3/1929 | Parry | 251/285 |
| 2,389,947 | 11/1945 | Allen | 251/228 X |
| 2,699,318 | 1/1955 | Ellison et al. | 251/298 X |
| 2,835,269 | 5/1958 | Seymour | 251/298 X |
| 3,119,594 | 1/1964 | Heggen | 251/298 X |
| 3,334,858 | 8/1967 | Hay | 251/298 X |
| 3,514,076 | 5/1970 | Wheatley | 251/298 X |
| 3,813,080 | 5/1974 | Rogers | 251/285 |
| 4,022,421 | 5/1977 | Carlin | 251/303 |
| 4,061,535 | 12/1977 | Nolan et al. | 137/527.8 |
| 4,098,085 | 7/1978 | McDowell | 137/527 |

FOREIGN PATENT DOCUMENTS

| 812279 | 8/1951 | Fed. Rep. of Germany . |
| 812280 | 8/1951 | Fed. Rep. of Germany . |
| 1950831 | 4/1971 | Fed. Rep. of Germany . |
| 110688 | 1/1975 | Fed. Rep. of Germany . |
| 2911949 | 9/1984 | Fed. Rep. of Germany . |

Primary Examiner—John Rivell
Attorney, Agent, or Firm—Schweitzer & Cornman

[57] ABSTRACT

A quick-action valve is opened and closed by a quarter turn. Safe closing with high mechanical advantage is provided, while the valve member is removed completely from the path of the flow upon valve opening. The valve member is fixed to a valve arm, mounted for rotation on a shaft. The valve includes an auxiliary shaft around which an actuating arm with a roller fixed to it are turnable. The roller moves the valve arm, or an auxiliary arm connected to it, so that upon closing it rolls substantially tangentially on a camming surface, thus bringing about maximum force transmission. A few degrees after the dead center position, rotation of the actuating arm is limited by a stop, and self-holding takes place in the closed position. In a preferred version the roller runs in the groove on the valve arm or auxiliary arm. Thus it positively moves the valve member upon opening and closing, and with the aid of an elastic stop element tensioning and self-holding will occur through the elastic stop after the dead center in the fully open position as in closed position.

8 Claims, 3 Drawing Sheets

QUICK-ACTION VALVE

"This application is based upon and claims the benefit of PCT/HU86/0054 of Oct. 17, 1986."

BACKGROUND AND SUMMARY OF INVENTION

The invention relates to a quick-action valve closed and opened by turning of about 90° for pipes delivering liquid or gaseous medium.

There are quick-action valves supplementing the well-known good features of valves with quick operation. Such a valve is described for example in Hungarian Pat. No. 159,431 as the combination of the ball pivot and valve. In that valve the elastic tensioning of the valve member after its seating (which is a fundamental condition of the tight closing) is carried out by the applicant at medium pressure. According to Hungarian Pat. No. 156,529, the valve member is moved in the direction identical with the centerline of the valve seat by pressing in the balls at an angle. The same is carried out according to Hungarian Pat. No. 128,158 with a camshaft, and according to Hungarian Pat. No. 117,086 with an eccentric shaft. Hungarian Pat. No. 174,241 introduces a special valve that functions on the principle of bayonet locking. In Hungarian patent specification No. 166,856 a valve is described which turns as a flap and a mechanism that functions with hydraulic auxiliary energy.

A spherical valve, described in Hungarian patent specification No. 159,431, is not suitable for the tight closing of low-pressure media, or those where the flow direction is counter to the one designed. Thus it can be used only in special cases. The solutions described in Hungarian Pat. Nos. 156,529, 128,158, and 117,086 ensure adequate tensioning, but their common drawback is that the valve member can be lifted out only in the direction identical with the centerline of the valve seat, and even so only to a relatively slight extent; consequently the flow resistance of the valve is high. The apparatus according to Hungarian Pat. No. 174,241 lifts out the valve member in axial direction, but to a sufficient extent; on the other hand its construction and handling are difficult because of the axial-turning motion. The apparatus according to the Hungarian Pat. No. 166,856, as a result of the flap-type function, completely removes the valve member from the flow path, but its drawback is the difficult construction, incidental use of auxiliary energy, and its liability to failure.

The present invention is aimed at the realization of a solution, according to which the valve can be opened or closed by a single turn, it contains suitable mechanical advantage for the safe compression of the elastic valve member in closed position, it is capable while in open position of removing the valve member completely from the flow direction, and all these features are realized with a simple, safe apparatus without the need of auxiliary energy.

The invention is a quick-action valve, in which the valve member is fitted as a flap, i.e. it is fastened to a valve arm or similar structural element located outside the centerline of the valve seat and turnable around a main shaft perpendicular to the centerline. The valve includes an auxiliary shaft, the centerline of which is parallel with that of the main shaft, but it is arranged at an appropriate distance from it. An actuating arm, or similar rigid body, is rotatable around the auxiliary shaft, and fitted with a pressing element, suitably a roller (e.g., an axial ball bearing), the centerline of which is at a fixed instance from the auxiliary shaft. The roller engages a straight or nearly straight camming surface of the valve arm, or an auxiliary arm in rigid connection with the valve arm, so that upon full compression of the valve member, the camming surface in contact with the roller is perpendicular to the straight line interconnecting the center-lines of the roller and of the auxiliary shaft, i.e. a dead center position occurs. As a result of this construction, in the fully compressed position of the valve member a slight turn of the actuating arm brings about a much smaller displacement of the valve arm, which appears the other way round in the balance of forces. Hence a very high mechanical advantage will develop in the vicinity of the dead center position. This enables bringing about the high elastic compression force required for the safe, easy closing by hand through a small moment applied to the actuating arm.

Turning of the actuating arm is limited by a stop means fixed to, or on, the valve arm or to an auxiliary arm. The stop means is located to allow for the actuating arm to turn a few degrees past the dead center position, which results in the valve being self-holding in the closed position.

In a preferred construction an additional camming surface is formed on the valve arm or auxiliary arm symmetrically or nearly symmetrically with the first camming surface, which engages the roller when the valve is opened. The two camming surfaces are suitably the two side walls of a groove. In this construction an elastic stop element is inserted between the valve arm and valve case, or the auxiliary arm and valve case. The elastic stop is compressed in the open position of the valve. Thus in the fully open state, a dead center position a balance of forces exists that is similar to the fully closed state. Rotation of the actuating arm move than a few degrees beyond the dead enter position is prevented by a stop. Thus the open position of the valve is self-holding similarly to the closed position. The opening stop can be fastened to the valve case, or the valve arm, or an auxiliary arm.

In another embodiment, a spring, preferably a helical spring, or a weight-load, is connected to the shaft of the valve arm to turn the valve body in the opening direction. In this case there is no need for a second camming surface or for an elastic stop element compressed in the open state of the valve. On the other hand, opening of the valve is possible only by a force determined by the spring or weight-load, while this force has to be overcome for closing.

In a preferred version of of the above mentioned embodiment a conventional adjustable stop is mounted on the valve case to limit the movement of the actuating arm in the direction of opening, thus allowing the adjustment of open positions to a varying extent. This solution increases the advantageous features of the valve, in that the amount of the fluid medium flowing through the valve is finely adjustable.

According to a further preferred embodiment, the camming surface that supports the roller upon closing, is formed in such a way that when the valve body bears against the valve seat, the surface element in contact with the roller slightly slopes towards the closing direction, i.e. this surface-section is slightly concave. This enables the force transmission in this position to be similar to that of the positions closer to the dead center.

DETAILED DESCRIPTION

Figure 1:
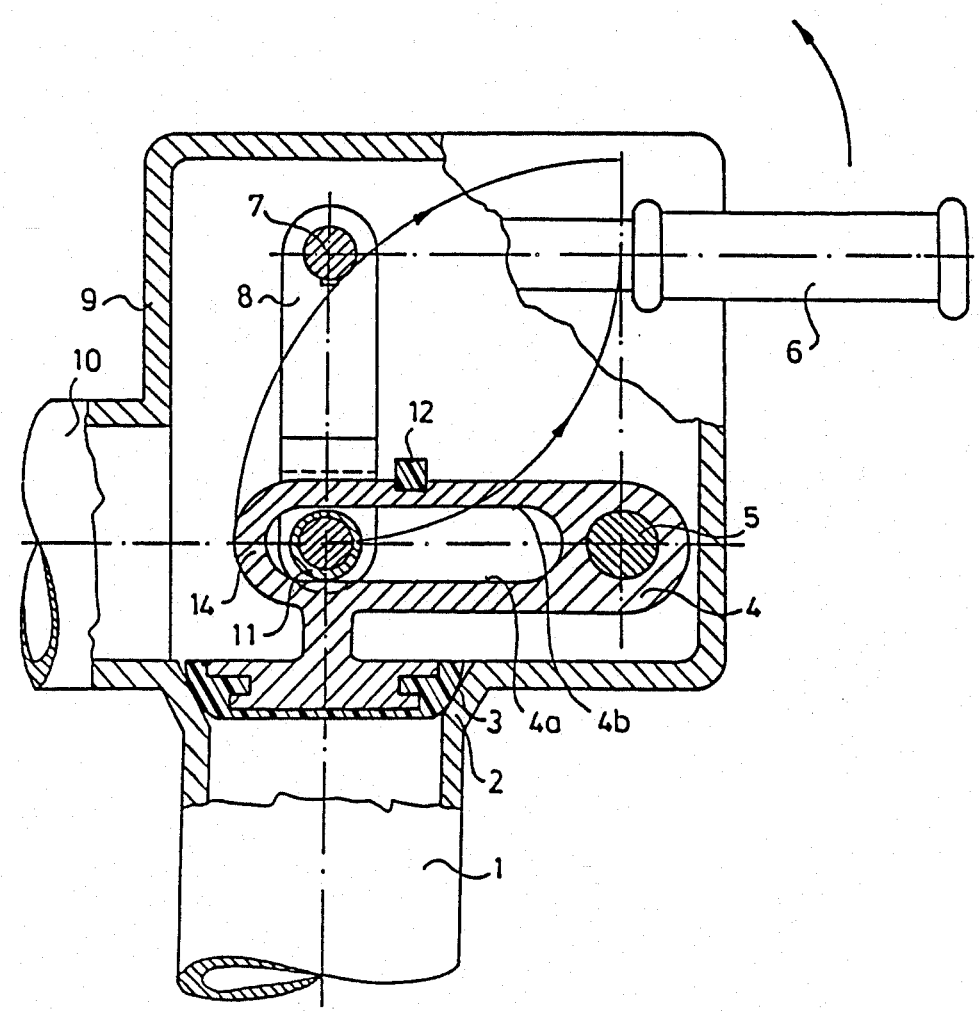
FIG. 1.: shows mainly the sectional view of a possible embodiment according to the invention, FIG. 2.: sectional view of another preferred embodiment according to the invention.

FIG. 1 shows construction of an angle valve according to the invention. Pipe branches 1 and 10 have a sealed connection with a valve case 9 according to a conventional method, e.g. welded, threaded, or flanged joint, cast in one, etc. An elastic coated segment-shaped valve body 3, vulcanized to metal material, is seated on a tapered valve seat 2. The valve seat and valve body naturally may be different, conventional constructions.

Shaft 5 and valve arm 4 are fitted to each other and to the valve case 9 so as to allow the free turning of the valve arm 4 around the centerline of the shaft 5. The two mantles of the groove machined in the centerline of the valve arm 4 form camming surfaces 4a and 4b. Roller 11 is supported by camming surface 4a for closing, and by camming surface 4b for opening. The closed ends of the groove from limit stops 14 in open and closed positions of the valve.

Roller 11 is fixed to actuating arm 8 with a known method, e.g. shrink-jointed pin. The shape of the actuating arm 8 is such that it does not obstruct the movement of valve arm 4 and valve body 3 between the open and closed positions. The actuating arm is in rigid connection with the shaft 7 according to a known method, e.g. slot joint. Shaft 7 is educted from the valve case 9 in sealed condition, and an operating arm 6 is fixed to it similarly with rigid connection. The sealed eduction may be stuffing box, "O"-seal or other known method.

The drawing shows the closing dead center position, i.e. the most tensioned state of the valve body 3. From this dead center position the actuating arm can be moved with very small force in any direction, and thereafter the movement is assisted by the elastic deformation of the valve body 3. Thus moving the actuating arm 8 in closing direction opposite the arrows, the roller 11 impacts the closing stop 14 and this position is self-holding. In the open position, instead of the valve body 3, an elastic arresting element 12, mounted on the valve arm 4, is compressed against the inside of the valve case 9 resulting in elastic self-holding similarly to the closing.

The valve is opened by turning the operating arm 6 in the direction of the arrows counter-clockwise at 90° by a few degrees after the dead center position, whereby the valve arm 4 turns 90 degrees, and the valve body 3 moves completely out of the fluid flow path.

Figure 2:
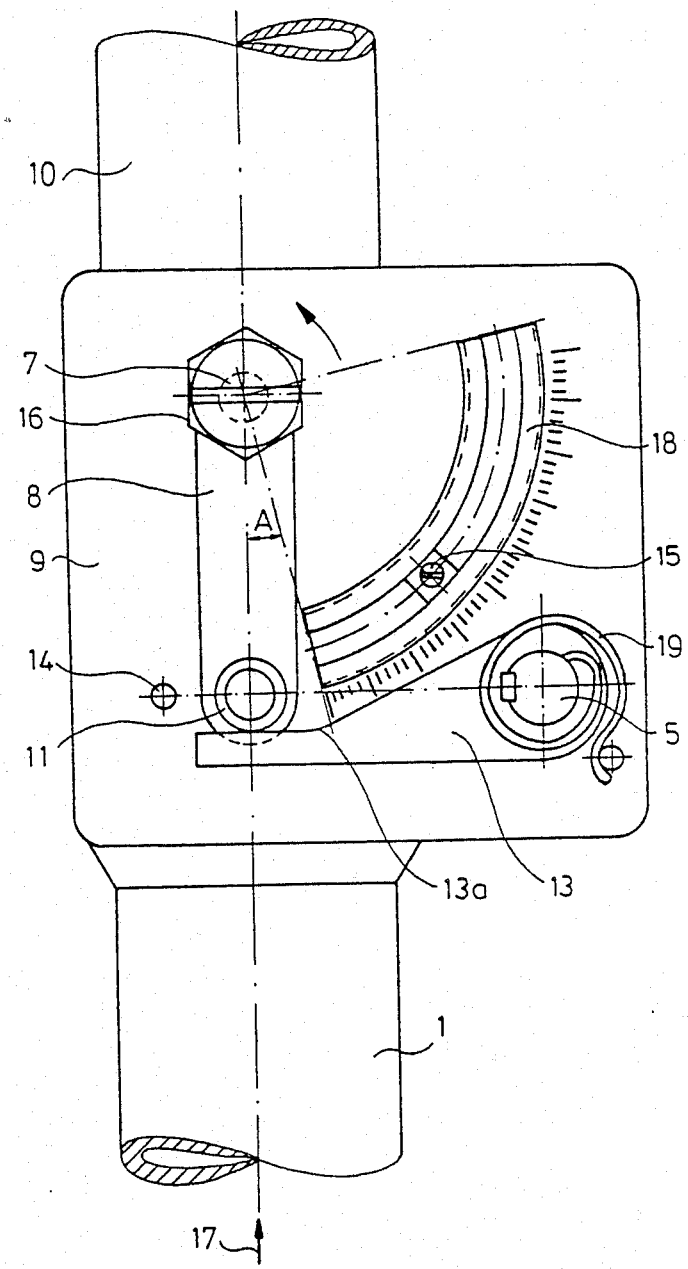

FIG. 2 shows the construction of a uniaxial, transitional valve.

In this solution the shaft is educted from the valve case 9 in sealed condition, while the hole of shaft 7 in the valve case does not lead into the interior. Thus the actuating arm 8 mounted on the shaft 7 and the roller fixed on it, as well as the auxiliary arm 13 mounted on shaft 5 with rigid connection are all outside the valve case 9.

A camming surface 13a on the auxiliary arm 13 engages the roller 11 upon valve closing. The position of the actuating arm 8 corresponds to the seating of the valve body is at an angle A from the dead center position of the closing shown in FIG. 2, where the camming surface 13a slightly slopes in closing direction to require less turning moment on shaft 7 when tensioning of the valve body begins. An impact stop after the closing dead center position is provided by a stop catch 14 fixed to the valve case 9.

In the construction of FIG. 2 the auxiliary arm 13 does not have a camming surface for the opening direction. Hence the shaft 5 is loaded by spiral spring 19 to rotate in the opening direction. In this version only the spring force is available for opening the valve. Therefore mounting of the valve is advisable only in the flow direction of the medium indicated by arrow 17.

A hexagon-end 16 instead of the operating arm is arranged on the end of shaft 7, which can be turned only with a special key suited to its shape. This solution is preferred in order to prevent the valve from being used by unauthorized persons.

In certain cases it is necessary to restrict the open position of the valve to different extent. For this purpose the mechanism according to the invention is better than the usual one, it gives finer adjustment, since the adjustable stop 15 restricts rotation of the actuating arm 8 in the opening direction. In this case very small valve displacement is required for the well measurable turning of the actuating arm in the vicinity of the closed position of the valve. The adjustable stop may be of any conventional solution. The drawing shows a pair of rails 18 provided with scale, and the stop 15 fixed with a simple screw guided in the pair of rails.

Opening and closing of the valve are similar to the version shown in FIG. 1., with the difference that here the opening is automatically accomplished by a spiral spring 19 when the actuating arm 8 is moved in the valve-opening direction.

Several other structural versions can be formed from the combination of the presented two versions. Thus for example in a preferable construction the actuating arm 8 with the roller 11 and the auxiliary arm 13 are arranged outside the valve case 9 in a manner similar to FIG. 2. The arm 13, however is formed with two camming surfaces, whereby the spiral spring 19 can be dispensed with, and the valve can be built to accommodate both flow directions of the medium.

Figure 3:
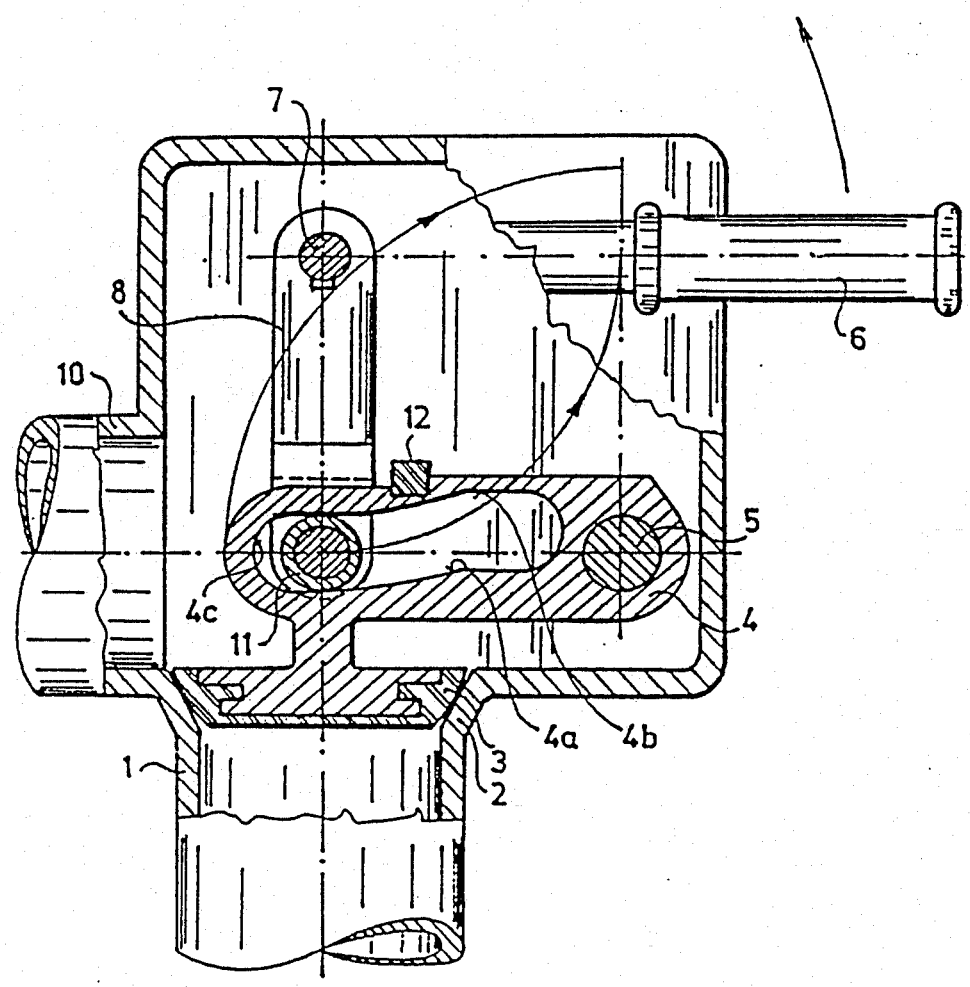
FIG. 3.: is a sectional view, similar to FIG. 1, illustrating a valve arm provided with a slightly concave camming surface.

In the version of FIG. 3, the valve arm 4 is formed with a camming surfaces which are slightly concave in the vicinity of the area of contact with the roller 11 when the valve member 3 is in a closed position.

It is evident that the valve according to the invention is indeed simple and it has only a small number of parts inclined to failure. Its operation is fast. The valve body is completely removed from the flow direction upon opening. At the same time, upon closing it is provided with a suitable mechanism for the compression force required for the safe closing with relatively small manual effort. It ensures self-holding either open or closed positions. Furthermore, it is suitable for the fine adjustment of open positions to different extent.

What is claimed is:

1. In a quick-action valve of the type having
   (a) a valve housing,
   (b) a valve member mounted within said housing,
   (c) a pivot shaft for said valve member positioned in laterally offset relation to the centerline of said valve member, and
   (d) an actuating mechanism for said valve member, the improvement characterized by (d) a valve arm fixed to and rotatable with said pivot shaft and operable to move said valve member between its closed position and an open position substantially at right angles thereto, (e) an actuating arm rotatable on said valve housing and mounting an actuating roller adjacent its free end, (f) said valve arm having an elongated recess forming valve-closing and valve-opening camming surfaces arranged for cooperation with said actuating roller, whereby upon rotation of said actuating arm in a predetermined valve-closing or valve-opening direction said valve arm is positively actuated to rotate said valve to a closed or open position, (g) the pivot axis of said actuating arm being so located that when said valve is in a fully closed or fully open position said actuating arm is substantially in a dead-center position with respect to one of said camming surfaces, (h) said actuating arm being pivotable into predetermined closing or opening limit position slightly beyond, said dead-center positions in the valve-closing or valve-opening directions, (i) cooperative stop means associated with said actuating arm and defining said limit positions, and (j) compressible resilient means operative when said actuating arm is in either a valve-closed limit position or a valve-open limit position to urge said valve arm in an opposing direction and thus to urge said actuating arm into said limit position, whereby said valve is positively locked in its closed or open position, as the case may be.

2. A quick-acting valve according to claim 1, further characterized by (a) said compressible resilient means operative in the valve-closed position comprising resilient elements forming part of the cooperating valve and valve seat, (b) said compressible resilient means operative in the valve-open position comprising a resilient element carried by said valve arm and compressible against the valve housing, (c) said resilient elements being compressed more than necessary when said actuating arm is in a dead-center position and remaining sufficiently compressed when said actuating arm is in its limit positions to maintain said valve element in its fully closed or fully open position.

3. A quick acting valve according to claim 1, further characterized by (a) said recess being slightly concave in the vicinity of contact with said roller when said actuating arm is in a valve-closing position.

4. In a quick-action valve of the type having (a) a valve housing, (b) a valve member mounted within said housing, (c) a pivot shaft for said valve member positioned in laterally offset relation to the centerline of said valve member, and (d) an actuating mechanism for said valve member, the improvement characterized by (d) a valve arm fixed to and rotatable with said pivot shaft and operable to move said valve member between its closed position and an open position substantially at right angles thereto, (e) an actuating arm rotatable on said valve housing and mounting an actuating roller adjacent its free end, (f) said valve arm having a camming surface arranged for cooperation with said actuating roller, whereby upon rotation of said actuating arm in a predetermined valve-closing direction said valve arm is positively actuated to rotate said valve to a closed position, (g) the pivot axis of said actuating arm being so located that when said valve is in a fully closed position said actuating arm is substantially in a dead-center position with respect to said camming surfaces, (h) said actuating arm being pivotable into predetermined closing limit position slightly beyond, said dead-center position in the valve-closing direction, (i) cooperative stop means associated with said actuating arm and defining said limit position, and (j) compressible resilient means operative when said actuating arm is in a valve-closed limit position to urge said valve arm in an valve-opening direction and thus to urge said actuating arm into said limit position, whereby said valve is positively locked in its closed position (k) said camming surface being slightly concave in the vicinity of its contact with said roller when said actuating arm is in or near its valve closed dead-center position.

5. A quick acting valve according to claim 4, further characterized by (a) said valve arm being mounted on and fixed to said pivot shaft independently of said valve member.

6. A quick acting valve according to claim 4, further characterized by (a) bias means acting on said valve arm tending to bias said valve arm in a valve opening direction.

7. A quick acting valve according to claim 6, further characterized by (a) adjustable stop means for limiting movement of said valve arm in the valve opening direction.

8. A quick-acting valve according to claim 4, further characterized by (a) said valve arm having a recess therein for receiving said roller, (b) said recess having opposed, generally parallel camming surfaces for positively actuating said valve arm in valve-closing or valve-opening directions upon rotation of said actuating arm.

* * * * *